United States Patent [19]
Neff et al.

[11] Patent Number: 5,412,988
[45] Date of Patent: May 9, 1995

[54] ACCELERATION SENSOR

[75] Inventors: Helmut Neff, Hermannsburg; Joachim Beeck, Soltaü, both of Germany

[73] Assignee: TZN Forschungs-und Entwicklungszentrum Unterlüss GmbH, Unterlüss, Germany

[21] Appl. No.: 114,170

[22] Filed: Sep. 1, 1993

[30] Foreign Application Priority Data

Sep. 4, 1992 [DE] Germany .................. 42 29 558.0

[51] Int. Cl.⁶ ............... G01P 15/08; G01B 7/24
[52] U.S. Cl. ................. 73/517 R; 324/207.13
[58] Field of Search ............. 73/517 R, 561; 324/207.13

[56] References Cited

U.S. PATENT DOCUMENTS

| | | | |
|---|---|---|---|
| 4,841,772 | 6/1989 | Paik | 73/382 G |
| 4,912,408 | 3/1990 | Sawada | 324/207.13 |
| 5,166,612 | 11/1992 | Murdock | 73/651 |
| 5,224,380 | 7/1993 | Paik | 73/517 A |

FOREIGN PATENT DOCUMENTS

| | | |
|---|---|---|
| 0301816 | 2/1989 | European Pat. Off. . |
| 0306178A2 | 3/1989 | European Pat. Off. . |
| 3440811 | 4/1986 | Germany . |
| 3538186 | 8/1988 | Germany . |
| 4103589 | 8/1992 | Germany . |

OTHER PUBLICATIONS

John Clarke, "Squid Concepts and Systems", *Superconducting Electronics*, Springer-Verlag Berlin, NATO ASI Series, vol. 59, 1989, pp. 87–148.

C. Jewell, "The Development of Cryocoolers for Space Applications", *Preparing for the Future*, European Space Agency, vol. 1, No. 2, Dec. 1991, pp. 2–4.

*Primary Examiner*—Hezron E. Williams
*Assistant Examiner*—Christine K. Oda
*Attorney, Agent, or Firm*—Spencer, Frank & Schneider

[57] ABSTRACT

An acceleration sensor includes a silicon substrate with a micromechanical bender bar constituting a testing mass having one end mounted the silicon substrate and a free end opposite the one end. A ferromagnetic core is mounted on the free end of the micromechanical bender bar. An excitation coil is supported on the ferromagnetic core for furnishing an inhomogeneous magnetic field when supplied with an alternating current. A cooled superconducting quantum interference detector (SQUID) arrangement is mounted adjacent the ferromagnetic core for detecting changes in the inhomogeneous magnetic field produced by the excitation coil and produces a useful signal in dependence of changes in the inhomogeneous magnetic field.

11 Claims, 3 Drawing Sheets

ACCELERATION SENSOR

BACKGROUND OF THE INVENTION

The invention relates to an acceleration sensor including a testing mass which is displaceable by an external force and a detection device for determining the displacement of the testing mass.

Sensitive acceleration sensors are important in navigation and space flight to ensure gravitation-free states, for measuring vibrations, and in reservoir exploration. Such acceleration sensors are essentially based on the displacement of a heavy mass under the influence of an accelerating force. The displacement obtained in this manner is converted into a suitable physical measuring value, for example, into a change in resistance, capacitance, etc., and can therefore be evaluated in a corresponding measuring circuit.

Prior art acceleration sensors, which, for example, use gyros or strain gauges in connection with the displacement of a test mass, are relatively insensitive, mechanically complex and expensive.

Piezoelectric acceleration sensors, as disclosed, for example, in German Patent No. 3,440,811 generally have a measuring range in the order of magnitude of 0.1 to 3 g.

SUMMARY OF THE INVENTION

It is an object of the invention to provide an acceleration sensor of the type first mentioned above which is miniaturized and demonstrates extremely high sensitivity.

The above and other objects are accomplished according to the invention by the provision of an acceleration sensor, comprising: a silicon substrate; a micromechanical bender bar constituting a testing mass having one end mounted on the silicon substrate and a free end opposite the one end; a ferromagnetic core mounted on the free end of the micromechanical bender bar; an excitation coil supported on the ferromagnetic core for furnishing an inhomogeneous magnetic field when supplied with an alternating current; and a cooled superconducting quantum interference detector (SQUID) arrangement mounted adjacent the ferromagnetic core for detecting changes in the inhomogeneous magnetic field produced by the excitation coil and producing a useful signal in dependence of changes in the inhomogeneous magnetic field.

This type of highly sensitive acceleration sensor, which covers a wide dynamic range, is miniaturized due to the silicon technology employed (small dimensions and light weight) and may also be cost-effectively manufactured in comparatively large quantities, while obtaining a sensitivity of $10^{-7}$ to possibly $10^{-10}$ g. The acceleration sensor according to the invention is thus particularly suitable for space flight, since it may be used to measure very small accelerations.

A superconducting quantum interference detector, also referred herein by the acronym SQUID, and its arrangement for measuring magnetic fields together with an electronic unit for evaluation, processing and depicting the information obtained, such as when used with an acceleration sensor according to the invention, are known per se. In this regard, see German Offenlegungsschrift (unexamined published German patent application) Nos. 3,247,543 (U.S. Pat. No. 4,749,946); 3,247,585 (U.S. Pat. No. 4,591,787); 3,515,237 (U.S. Pat. No. 4,761,611); 3,529,815 (U.S. Pat. No. 4,864,237); and 3,538,186 (Digitalization of SQUID signals) or 4,027,481 (U.S. Pat. No. 5,030,614), for which high temperature superconductors, such as $YBa_2Cu_3O_{7-x}$, may be used.

BRIEF DESCRIPTION OF THE DRAWINGS

The invention will be further elucidated below by way of an embodiment shown in the accompanying drawings.

DETAILED DESCRIPTION OF THE PREFERRED EMBODIMENT

Figure 1:
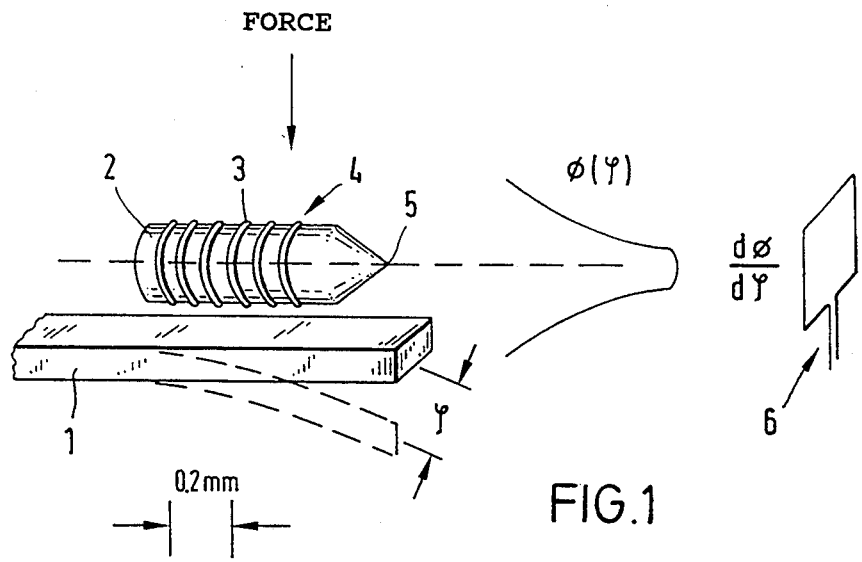
FIG. 1 is a schematic illustrating the physical principle applied in an acceleration sensor according to the invention.

Referring to FIG. 1, there is shown a schematic illustrating the principle of operation of an acceleration sensor according to the invention. A micromechanical bender bar 1 is fastened at one end (not shown in FIG. 1) and has a free end that supports a ferromagnetic core 2 including an excitation coil 4 having n windings 3. Ferromagnetic core 2 has a distinct tip or a sharp edge 5. If current passes through the excitation coil 4 it produces an inhomogeneous, local magnetic field, with the schematic course of its magnetic flux $\Phi(\phi)$ being depicted as a function of the deflection $\phi$ of the bender bar 1 in FIG. 1. The inhomogeneous magnetic field acts on the pickup winding of a SQUID 6 (superconducting quantum interference detector) or possibly a SQUID arrangement (manufactured in thin film technology) which, as a magnetometer measures the change in the magnetic flux $d\Phi/d\phi$, when an exterior force bends the bender bar 1.

Figure 2:
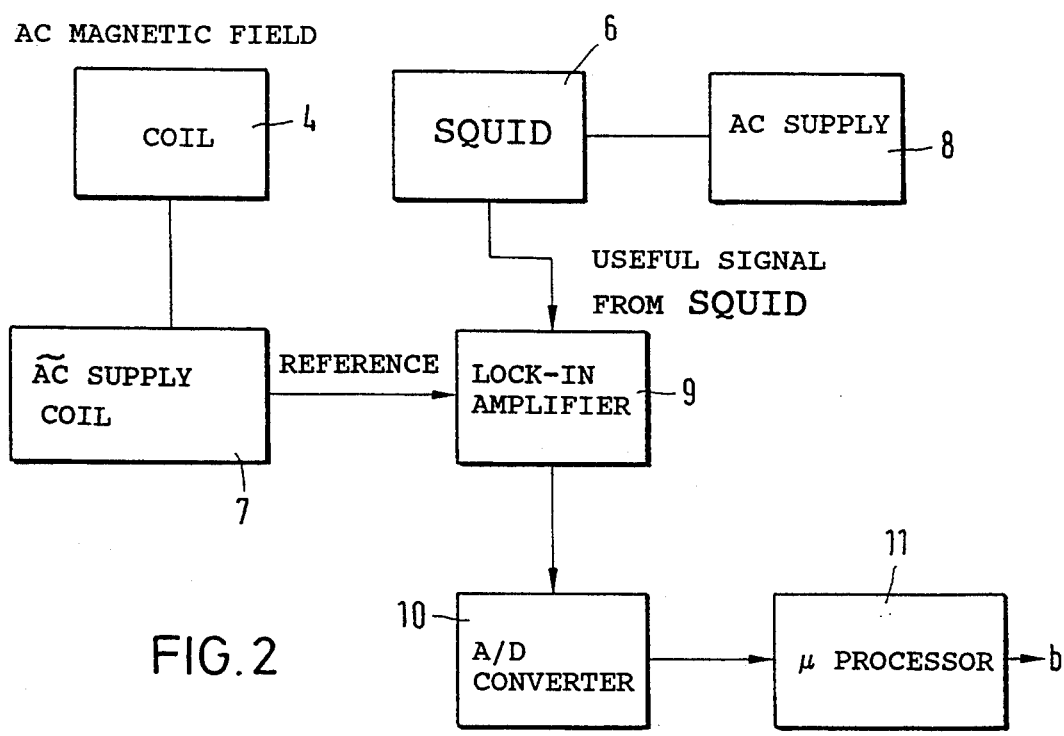
FIG. 2 is a block circuit diagram of an embodiment for an electronic arrangement of the acceleration sensor according to the invention.

As shown in FIG. 2, an alternating current supply 7 supplies excitation coil 4 with an alternating current of a predetermined frequency and an alternating current supply 8 similarly supplies SQUID 6 with an alternating current of a predetermined frequency. SQUID 6 produces a useful output signal that is preferably fed to a lock-in amplifier 9 by way a non-illustrated signal-matching circuit. A commercially available lock-in amplifier that may be used for lock-in amplifier 9 is built, for example, by EG&G and sold as model 5301A. A signal-matching circuitry for use in the SQUID arrangement is disclosed in J. Clarke, NATO ASI-series Superconducting Electronics, edited by H. Weinstock and M Nisenhoff (Springer, Berlin 1989, p. 87). Lock-in amplifier 9 has a reference signal input for receiving a reference signal constituted by the alternating current signal from alternating current supply 7 that supplies the excitation current to excitation coil 4. Lock-in amplifier produces an output signal 9 that is supplied to an A/D converter 10 whose output is connected to a microprocessor 11 for digital signal processing.

Different deflections of the bender bar 1 result in different indications of the magnetic field produced by excitation coil 4. If these deflections are small, they are directly correlated with the influencing force, i.e., the acceleration. For greater deflections, the relationship is no longer linear. In general, it is necessary to determine the relationship from a series of measurements or even from mechanical observations in order to obtain a calibration curve or a conditional function which establishes the relationship between the deflection of bender bar 1 and the magnetic field measured at the location of SQUID 6 in order to determine the acceleration.

Advantageously, the alternating current is supplied to excitation coil 4 and, simultaneously as a reference for lock-in amplifier 9 results, on account of frequency selection, in an extremely narrow-band amplification of the SQUID signal with very little noise, a correspondingly high sensitivity, and an improved dynamic range. Due to reduced 1/f noise, a frequency range from $10^3$ to $10^4$ Hz would be desirable.

Figure 3:
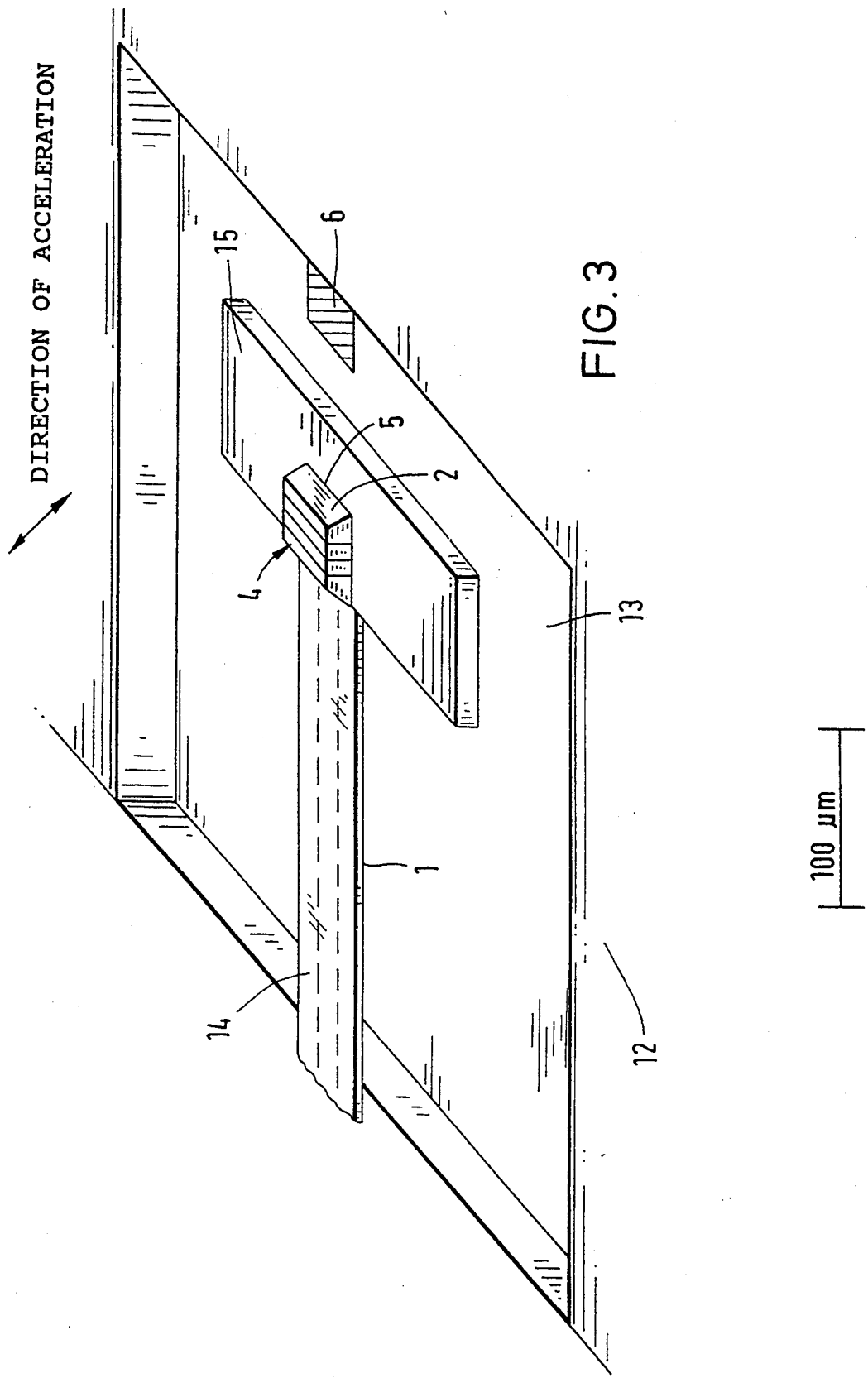
FIG. 3 is a schematic of a partial perspective view of one embodiment of an acceleration sensor according to the invention.
Figure 4:
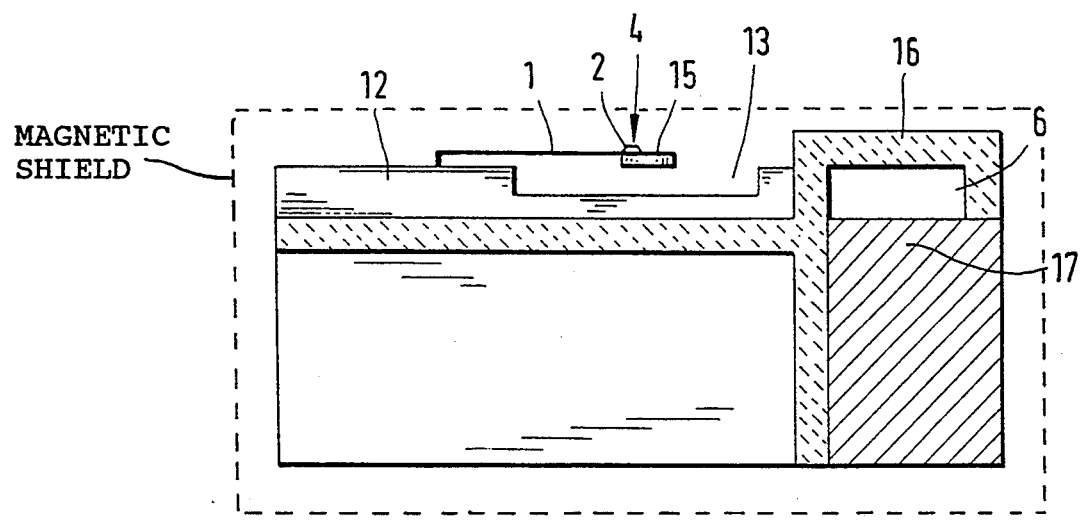
FIG. 4 is a schematic of a sectional side view of an acceleration sensor according to the invention.

With reference to FIGS. 3 and 4 the acceleration sensor comprises a silicon substrate 12 having a window or recess 13. Micromechanical bender bar 1 is preferably configured as one piece with the silicon substrate 12, extends into the region of window 13, and essentially has a length of several 100 μm, a width much greater than its thickness, and a length much greater than its width. Ferromagnetic core 2 is arranged at the free end of the bender bar 1. Excitation coil 4 has n windings and is configured as a microelectronic component arranged on ferromagnetic core 2 so that it is electrically insulated from the core. A winding number, for example, of 4 to 20 would be desirable. Current is supplied to excitation coil 4 by electrical conductor paths 14 on bender bar 1. Ferromagnetic core 2 is provided with a tip or sharp edge 5 that extends transversely of the longitudinal axis of bender bar 1. The dimensions of the ferromagnetic core 2 are advisably in the order of magnitude of approximately 1 to 10 mm. A further mass 15 may be additionally arranged at the free end of the bender bar 1.

The silicon substrate 12 is arranged on a thermal insulating body 16 and further receives a cooled SQUID 6 whose pickup winding (not shown) is arranged adjacent to window 13 and opposite sharp edge 5 of ferromagnetic core 2. SQUID 6, in particular, is one based on a high temperature superconductor, for example, $YBa_2Cu_3O_{7-x}$. It is cooled, for example, by a cooling surface 17 to the temperature of liquid nitrogen. This is preferably done by means of a gas stream cooler such as a Joule-Thompson cooler or a Split-Stirling cooler. Coolers of this sort are provided, for example, by British Aerospace (UK) as reported in the ESA-newsletter: Preparing for the Future", Vol 1, No. 2, December 1991, pp. 1–4.

Preferably, the acceleration sensor is shielded from the influence of stray external magnetic fields by a magnetic shield which can comprise a casing made of either magnetic or magnetizable material. The casing may, for example, be made of μ-metal which surrounds the sensor at least in the region of the inhomogeneous magnetic field produced by ferromagnetic core 2 excitation coil 4, as well as the pickup coil (not shown) of the SQUID.

Obviously, numerous and additional modifications and variations of the present invention are possible in light of the above teachings. It is therefore to be understood that within the scope of the appended claims, the invention may be practiced otherwise than as specifically disclosed and claimed herein.

What is claimed is:

1. An acceleration sensor, comprising:
   a silicon substrate;
   a micromechanical bender bar constituting a testing mass having one end mounted on said silicon substrate and a free end opposite said one end;
   a ferromagnetic core mounted on the free end of said micromechanical bender bar;
   an excitation coil supported on said ferromagnetic core for furnishing an inhomogeneous magnetic field when supplied with an alternating current;
   a cooled superconducting quantum interference detector (SQUID) arrangement mounted adjacent said ferromagnetic core for detecting changes in the inhomogeneous magnetic field produced by said excitation coil and producing a useful signal in dependence of changes in the inhomogeneous magnetic field; and
   a lock-in amplifier having a first input for receiving the useful signal from said SQUID arrangement and a reference signal input for receiving an alternating current having the same frequency as the alternating current supplied to said excitation coil for activating said lock-in amplifier for amplifying the useful signal.

2. The acceleration sensor according to claim 1, wherein said ferromagnetic core has a tip facing said SQUID arrangement.

3. The acceleration sensor according to claim 2, wherein said tip comprises a sharp edge.

4. The acceleration sensor according to claim 1, and further comprising an additional mass mounted at the free end of said micromechanical bender bar.

5. The acceleration sensor according to claim 1, and further comprising a thermally insulating body arranged between said SQUID arrangement and said silicon substrate for thermally insulating said SQUID arrangement from said silicon substrate.

6. The acceleration sensor according to claim 1, and further comprising a magnetic shield surrounding said acceleration sensor for shielding said acceleration sensor against stray magnetic fields.

7. The acceleration sensor according to claim 6, wherein said magnetic shield comprises a casing made of magnetic material.

8. The acceleration sensor according to claim 6, wherein said magnetic shield comprises a casing made of a magnetizable material.

9. The acceleration sensor according to claim 8, wherein said magnetizable material comprises μ-metal.

10. The acceleration sensor according to claim 1, and further comprising a Joule-Thompson cooler for cooling said SQUID arrangement.

11. The acceleration sensor according to claim 1, and further comprising a Slit-Stirling cooler for cooling said SQUID arrangement.

* * * * *